(12) United States Patent
Takei (10) Patent No.: US 7,342,733 B2
(45) Date of Patent: Mar. 11, 2008

(54) LENS ACTUATING DEVICE AND IMAGE PICKUP APPARATUS

(75) Inventor: Tomoya Takei, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/446,366

(22) Filed: Jun. 5, 2006

(65) Prior Publication Data
US 2006/0279849 A1 Dec. 14, 2006

(30) Foreign Application Priority Data
Jun. 8, 2005 (JP) .............................. 2005-168472

(51) Int. Cl.
*G02B 7/02* (2006.01)
(52) U.S. Cl. .................... 359/824; 359/811; 359/819; 359/694
(58) Field of Classification Search ................ 359/811, 359/824
See application file for complete search history.

(56) References Cited

U.S. PATENT DOCUMENTS

| | | | |
|---|---|---|---|
| 5,774,273 A * | 6/1998 | Bornhorst | 359/665 |
| 6,188,530 B1 * | 2/2001 | Katsuragi | 359/824 |
| 6,392,827 B1 * | 5/2002 | Ueyama et al. | 359/824 |
| 6,493,151 B2 * | 12/2002 | Schachar | 359/666 |
| 2003/0002169 A1 * | 1/2003 | Guy | 359/666 |
| 2005/0100270 A1 * | 5/2005 | O'Connor et al. | 385/19 |

FOREIGN PATENT DOCUMENTS

| | | |
|---|---|---|
| JP | 02-262612 | 10/1990 |
| JP | 03-188430 | 8/1991 |
| JP | 07-120653 | 5/1995 |
| JP | 2000-194026 | 7/2000 |
| JP | 2002267921 A * | 9/2002 |

* cited by examiner

*Primary Examiner*—Jessica T Stultz
(74) *Attorney, Agent, or Firm*—Rader Fishman & Grauer PLLC; Ronald P. Kananen (57) ABSTRACT

A lens actuating device moves a movable lens held by a lens holder in predetermined directions. The lens actuating device has a power transmitting shaft connected to the lens holder for movement in axial directions thereof, and a fluid case having a shaft support sleeve and filled with a working fluid, the power transmitting shaft being axially slidably supported in the shaft support sleeve. The fluid case includes a piezoelectric device as a portion thereof. When a drive voltage is applied to the piezoelectric device, the piezoelectric device can be deformed to displace the working fluid in the fluid case to move the power transmitting shaft axially, thereby moving the lens holder and the movable lens in the predetermined directions.

8 Claims, 9 Drawing Sheets

FIG. 9

LENS ACTUATING DEVICE AND IMAGE PICKUP APPARATUS

CROSS REFERENCES TO RELATED APPLICATIONS

The present invention contains subject matter related to Japanese Patent Application JP 2005-168472 filed in the Japanese Patent Office on Jun. 8, 2005, the entire contents of which are incorporated herein by reference.

BACKGROUND OF THE INVENTION

The present invention relates to a lens actuating device and an image pickup apparatus and, more particularly, to the art of moving a movable lens based on the displacement of a working fluid that is caused when a piezoelectric device is deformed, so that the movable lens can be moved an increased distance with a reduced electric power consumption.

Lens actuating devices for moving a movable lens in predetermined directions are incorporated in video cameras, still cameras, and various image pickup apparatus including cellular phones, etc. The movable lens and a lens holder by which the movable lens is held jointly make up a movable unit, which is moved by the lens actuating device in the directions of the optical axis for focusing or zooming and also in directions perpendicular to the optical axis for correcting image blurs.

Some lens actuating devices have a linear actuator including an actuating coil, an actuating magnet, etc. For details, reference should be made to Japanese Patent No. 3387173, for example.

However, because of the components of the linear actuator, the lens actuating devices with the linear actuator are structurally complex, require a large installation space, and make the image pickup apparatus large in size.

Another problem is that those lens actuating devices have a large electric power requirement because the actuating coil needs to be energized at all times for keeping the movable unit in a desired position as well as moving the movable unit in its movable range.

Another lens actuating device employs a piezoelectric device that is elastically deformable when subjected to an externally applied voltage. For details, reference should be made to Japanese Patent Laid-open No. 2000-194026, for example. The piezoelectric device consumes a small amount of electric power and is small in size and weight.

However, the amount of deformation, or the amount of displacement, which the piezoelectric device produces when a voltage is applied thereto, is very small. If it is necessary to move the movable lens a large distance by the optical design, then a high voltage needs to be applied to the piezoelectric device or the piezoelectric device needs to be an increased length. As a result, the lens actuating device requires large electric power consumption or the image pickup apparatus becomes large in size.

SUMMARY OF THE INVENTION

There is a need to provide a lens actuating device and an image pickup apparatus which allow a movable lens to be moved an increased distance with reduced electric power consumption.

A lens actuating device and an image pickup apparatus according to the present invention have a power transmitting shaft connected to a lens holder for movement in an axial directions thereof and a fluid case having a shaft support sleeve and filled with a working fluid, the power transmitting shaft being axially slidably supported in the shaft support sleeve, and the fluid case including a piezoelectric device as a portion thereof. When a drive voltage is applied to the piezoelectric device, the piezoelectric device can be deformed to displace the working fluid in the fluid case to move the power transmitting shaft axially, thereby moving the lens holder and the movable lens in the predetermined directions.

In the lens actuating device and the image pickup apparatus according to the present invention, the movable lens is moved in a direction depending on the direction in which the power transmitting shaft is axially moved by the displacement of the working fluid.

Specifically, the lens actuating device according to the present invention is a lens actuating device for moving a movable lens held by a lens holder in predetermined directions and includes a power transmitting shaft adapted to be connected to the lens holder for movement in axial directions thereof and a fluid case having a shaft support sleeve and filled with a working fluid, the power transmitting shaft being axially slidably supported in the shaft support sleeve, and the fluid case including a piezoelectric device as a portion thereof. When a drive voltage is applied to the piezoelectric device, the piezoelectric device can be deformed to displace the working fluid in the fluid case to move the power transmitting shaft axially, thereby moving the lens holder and the movable lens in the predetermined directions.

In the lens actuating device, inasmuch as the displacement of the piezoelectric device is transmitted to the movable unit through the working fluid, the displacement of the piezoelectric device can be magnified and transmitted to the movable unit. Therefore, the lens actuating device allows the movable lens to be moved an increased distance with a reduced electric power consumption.

The lens actuating device further includes a pair of moving mechanisms for moving the lens holder in directions perpendicular to the optical axis of the movable lens, a pair of the fluid cases, and a pair of the power transmitting shafts supported respectively in the shaft support sleeves of the fluid cases for movement in the directions perpendicular to the optical axis of the movable lens, the power transmitting shafts being connected to the lens holder respectively through the moving mechanisms. The movable unit is movable in a plane including the directions perpendicular to the optical axis, so that image blurs can be corrected with increased reliability.

The fluid case has a portion except the shaft support sleeve, the portion not being positioned radially of the movable lens. Consequently, the space in the image pickup apparatus which incorporates the lens actuating device can be utilized effectively, and the image pickup apparatus can be reduced in size.

The image pickup apparatus according to the present invention includes a movable lens held by a lens holder, and a lens actuating device for moving the movable lens in predetermined directions. The lens actuating device includes a power transmitting shaft connected to the lens holder for movement in axial directions thereof, and a fluid case having a shaft support sleeve and filled with a working fluid, the power transmitting shaft being axially slidably supported in the shaft support sleeve, and the fluid case including a piezoelectric device as a portion thereof. When a drive voltage is applied to the piezoelectric device, the piezoelectric device can be deformed to displace the working fluid in the fluid case to move the power transmitting shaft axially, thereby moving the lens holder and the movable lens in the predetermined directions.

In the image pickup apparatus, inasmuch as the displacement of the piezoelectric device is transmitted to the movable unit through the working fluid, the displacement of the piezoelectric device can be magnified and transmitted to the movable unit. Therefore, the image pickup apparatus allows the movable lens to be moved an increased distance with reduced electric power consumption.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An image pickup apparatus according to the present invention is applicable to various image pickup apparatuses having a function to capture moving images or a function to capture still images, such as cellular phones, video cameras, still cameras, etc. A lens actuating device according to the present invention is applicable to various lens actuating devices incorporated in such image pickup apparatuses.

Figure 1:
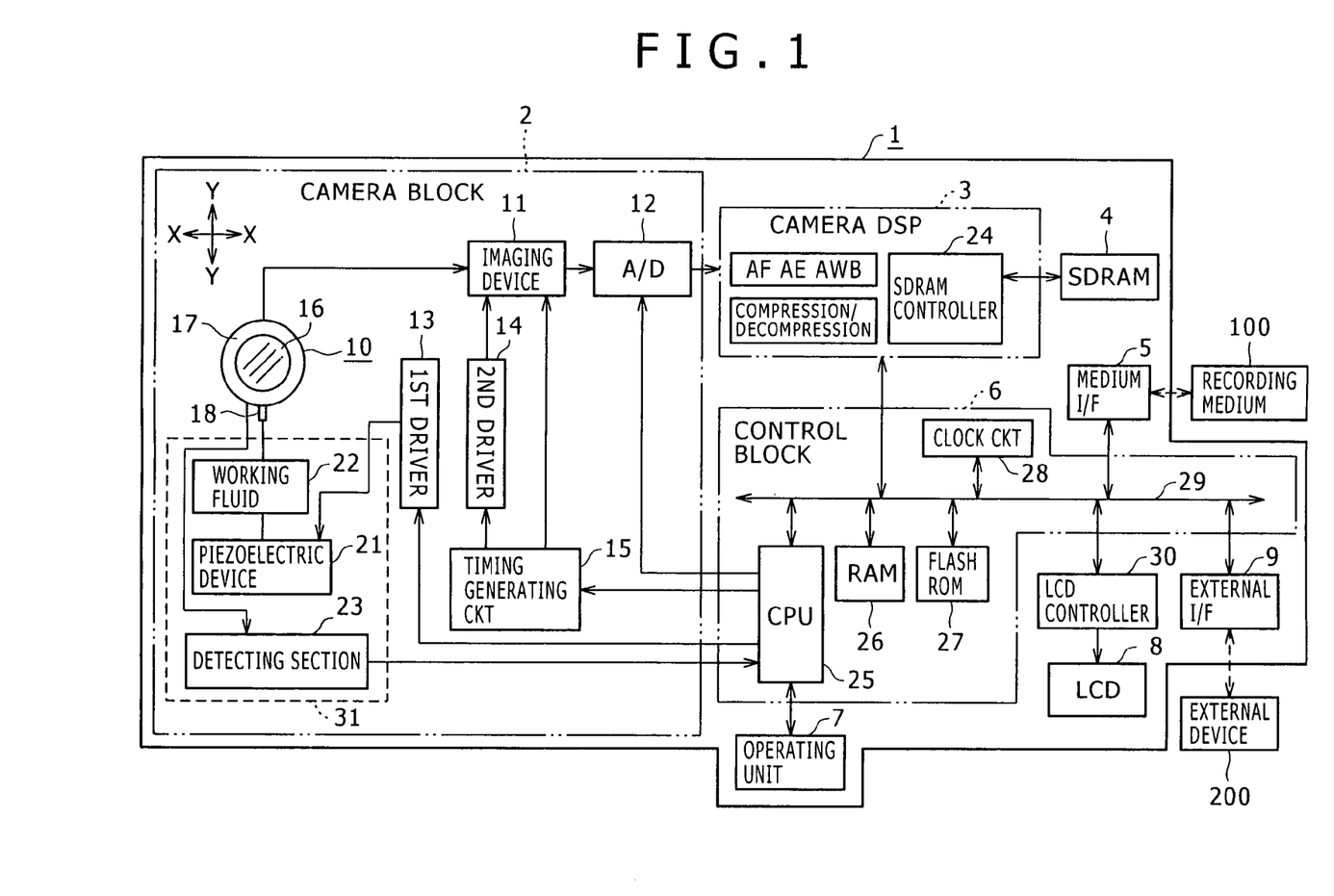
FIG. 1 is a block diagram of an overall arrangement of an image pickup apparatus according to an embodiment of the present invention showing the best mode of the invention together with FIGS. 2 through 9.

As shown in FIG. 1, an image pickup apparatus 1 has a camera block 2, a camera DSP (Digital Signal Processor) 3, an SDRAM (Synchronous Dynamic Random Access Memory) 4, a medium interface 5, a control block 6, an operating unit 7, an LCD (Liquid Crystal Display) 8, and an external interface 9. A recording medium 100 can be loaded removably into the image pickup apparatus 1.

The recording medium 100 may include a so-called memory card having a semiconductor memory or any of various disk-shaped recording mediums, such as recordable DVDs (Digital Versatile Disks), recordable CDs (Compact Discs), etc.

The camera block 2 has a movable unit 10, an imaging device 11, such as a CCD (Charge Coupled Device) or the like, an A/D converter 12, a first driver 13, a second driver 14, and a timing generating circuit 15.

Figure 2:
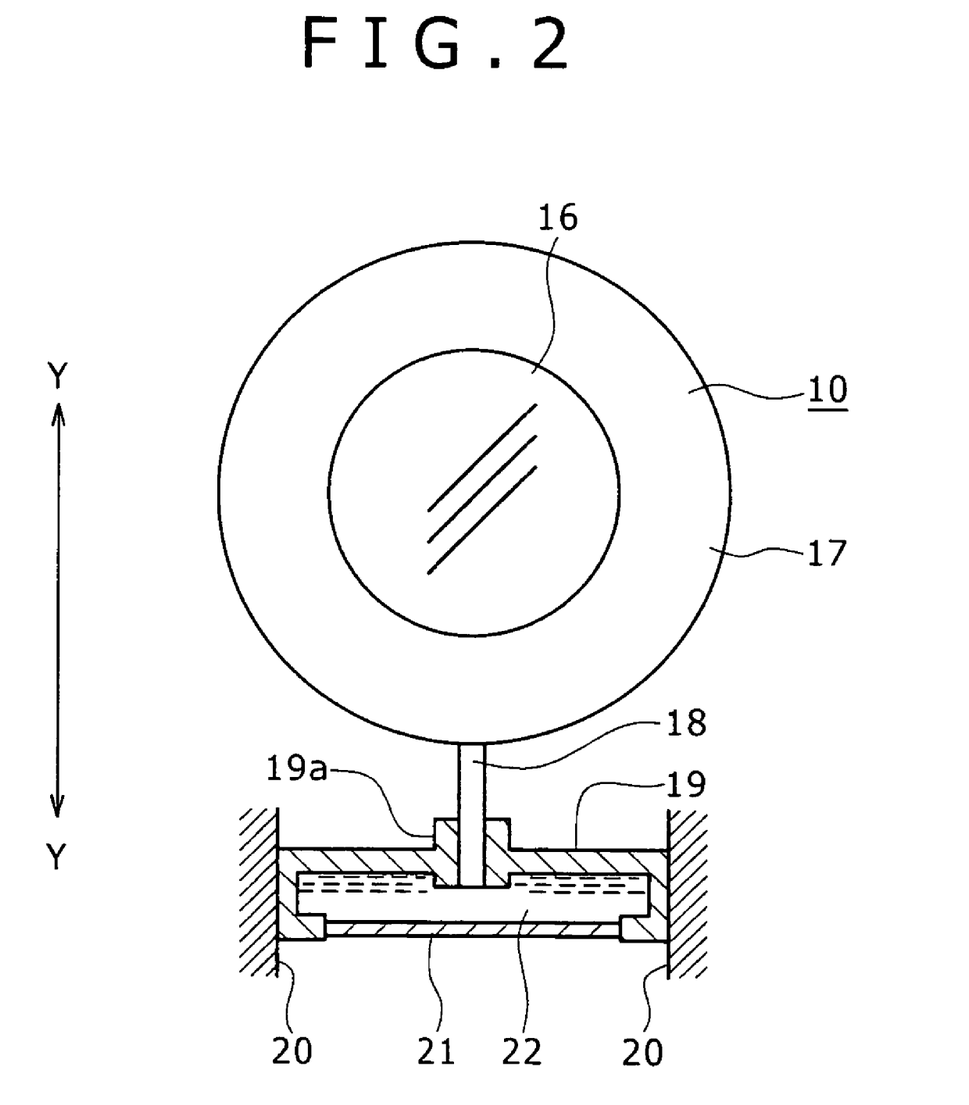
FIG. 2 is a front elevational view, partly in cross section, of a movable unit and a lens actuating device of the image pickup apparatus shown in FIG. 1.

The movable unit 10 includes a movable lens 16 such as a correcting lens for correcting image blurs caused by camera movements and subject movements, and a lens holder 17 holding the movable lens 16 (see also FIG. 2). The lens holder 17 is supported by a fluid case, to be described below, for vertical movement in the directions indicated by the arrows Y in FIG. 2.

As shown in FIG. 2, a power transmitting shaft 18 is connected to the lens holder 17. The power transmitting shaft 18 is in the form of a vertically elongate round rod and projects downwardly from the lens holder 17.

A fluid case 19 is disposed below the movable unit 10. The fluid case 19 is in the form of a box and has a vertically extending, cylindrical, shaft support sleeve 19a mounted on an upper panel thereof. The fluid case 19 has opposite side panels fixed to respective fixed walls 20 in the image pickup apparatus 1. The power transmitting shaft 18 is axially slidably supported in the shaft support sleeve 19a.

The fluid case 19 has a lower panel partly made of a piezoelectric device 21. The piezoelectric device 21 has a so-called bimorph structure having a pair of elements (ceramic elements) bonded to respective opposite surfaces of a metal plate, such as an iron plate, for example. When a positive drive voltage is applied to one of the elements and a negative drive voltage is applied to the other element, the piezoelectric device 21 is elastically deformed such that a central portion thereof is displaced upwardly. When a negative drive voltage is applied to one of the elements and a positive drive voltage is applied to the other element, the piezoelectric device 21 is deformed elastically such that the central portion thereof is displaced downwardly.

The piezoelectric device 21 is not limited to the bimorph structure, but it may be of a so-called unimorph structure having an element (ceramic element) bonded to one of opposite surfaces of a metal plate, such as an iron plate, for example. If the piezoelectric device 21 is of the unimorph structure, then when a drive voltage is applied to the element, the piezoelectric device 21 is elastically deformed such that a central portion thereof is displaced upwardly. When an opposite drive voltage is applied to the element, the piezoelectric device 21 is elastically deformed such that the central portion thereof is displaced downwardly.

The fluid case 19 is filled with a working fluid 22 having a certain viscosity.

As shown in FIG. 1, the imaging device 11 is energized by a drive signal from the second driver 14 to capture an image of a subject that is optically introduced through the movable lens 16. Based on a timing signal generated by the timing generating circuit 15 that is controlled by the control block 6, the imaging device 11 outputs an electric signal representing the captured image of the subject, i.e., image information thereof, to the A/D converter 12.

The imaging device 11 is not limited to a CCD, but it may include any of various devices such as a CMOS (Complementary Metal-Oxide Semiconductor) device or the like.

The A/D converter 12 performs CDS (Correlated Double Sampling) on the image information represented by the supplied electric signal to achieve a good S/N ratio, performs AGC (Automatic Gain Control) on the image information to control the gain, and also performs A/D (Analogto-Digital) conversion on the image information to produce a digital signal representing image data.

The first driver 13 sends a drive signal to the piezoelectric device 21 based on a command from a CPU, described later, of the control block 6.

The second driver 14 sends a drive signal to the imaging device 11 based on a timing signal output from the timing generating circuit 15.

The timing generating circuit 15 generates a timing signal to provide predetermined timing under the control of the control block 6.

The camera block 2 has a detecting section 23 for detecting an amount of displacement of the movable unit 10 in the directions indicated by the arrows Y. The detecting section 23 may include a magnetic detector, such as an MR (Magneto-Resistance) sensor or the like, or an optical detector, such as a Hall device or the like. The amount of displacement detected by the detecting section 23 is supplied as positional information of the movable unit 10 to the CPU of the control block 6.

The camera DSP 3 performs various signal processing processes including AF (Automatic Focus), AE (Automatic Exposure), AWB (Automatic White Balance), etc. on the image data supplied from the A/D converter 12. The image data processed by the camera DSP 3 is compressed according to a predetermined compression process. The compressed image data is output through the control block 6 to the recording medium 100, which records the image data as a file.

The camera DSP 3 has an SDRAM controller 24 for reading data from and writing data to the SDRAM 4 at a high speed.

The control block 6 includes a microcomputer having a CPU (Central Processing Unit) 25, a RAM (Random Access Memory) 26, a flash ROM (Read Only Memory) 27, and a clock circuit 28 which are interconnected by a system bus 29. The control block 6 has a function to control various components of the image pickup apparatus 1.

The CPU 25 sends command signals to the first driver 13 and the second driver 14 through the timing generating circuit 15 to operate the first driver 13 and the second driver 14. The CPU 25 is supplied with positional information of the movable unit 10 as detected by the detecting section 23, and it outputs a command signal to the first driver 13 based on the supplied positional information.

The RAM 26 is used as a working storage area for temporarily storing data produced by various processing sequences.

The flash ROM 27 stores various programs to be executed by the CPU 25 and data required for various processing sequences.

The clock circuit 28 outputs information representing the present date, the present day, the present time, the shooting time, etc.

The operating unit 7 includes a touch panel, control keys, etc. provided on a housing of the image pickup apparatus 1. In response to an user's actions on the operating unit 7, the operating unit 7 produces and outputs signals to the CPU 25, which send command signals to the various components based on the supplied signals.

The LCD 8 is mounted on the housing, for example, and is controlled by an LCD controller 30 connected to the system bus 29. The LCD 8 displays various items of information including image data based on a drive signal from the LCD controller 30.

The external interface 9 is connected to the system bus 29. The image pickup apparatus 1 can be connected to an external device 200, such as an external computer, through the external interface 9. When the image pickup apparatus 1 is connected to the external device 200, the image pickup apparatus 1 can receive image data from the external device 200 and record the received image data in the recording medium 100, or it can receive recorded image data from the recording medium 100 and output the received image data to the external device 200. The recording medium 100 is connected to the control block 6 through the medium interface 5 that is connected to the system bus 29.

When the external device 200, e.g., a communication module, is connected to the external interface 9, the image pickup apparatus 1 can be connected to a network such as the Internet or the like and can acquire various image data and other information through the network. The image pickup apparatus 1 can record the acquired image data and information in the recording medium 100 and send data recorded in the recording medium 100 through the network to a desired party.

The external interface 9 may be a wired interface according to IEEE (Institute of Electrical and Electronics Engineers) 1324 or USB (Universal Serial Bus), or a wireless interface based on light or radio waves.

Image data recorded in the recording medium 100 is read from the recording medium 100 according to an operating signal based on the user's action on the operating unit 7, and sent through the medium interface 5 to the camera DSP 3.

The camera DSP 3 decompresses, i.e., expands, compressed image data read from the recording medium 100 and supplied thereto, and sends the decompressed image data through the system bus 29 to the LCD controller 30. The LCD controller 30 sends an image signal based on the supplied image data to the LCD 8, which displays an image based on the supplied image signal.

In the image pickup apparatus 1 constructed as described above, the power transmitting shaft 18, the fluid case 19, the piezoelectric device 21, the working fluid 22, and the detecting section 23 serve as components of a lens actuating device 31 (see FIG. 1) for moving the movable unit 10.

When the CPU 25 sends a command signal to the first driver 13 based on the positional information of the movable unit 10 that is detected by the detecting section 23, the first driver 13 outputs a drive signal to the piezoelectric device 21, and a power supply circuit, not shown, applies a drive voltage to the piezoelectric device 21 to deform the piezoelectric device 21.

Figure 3:
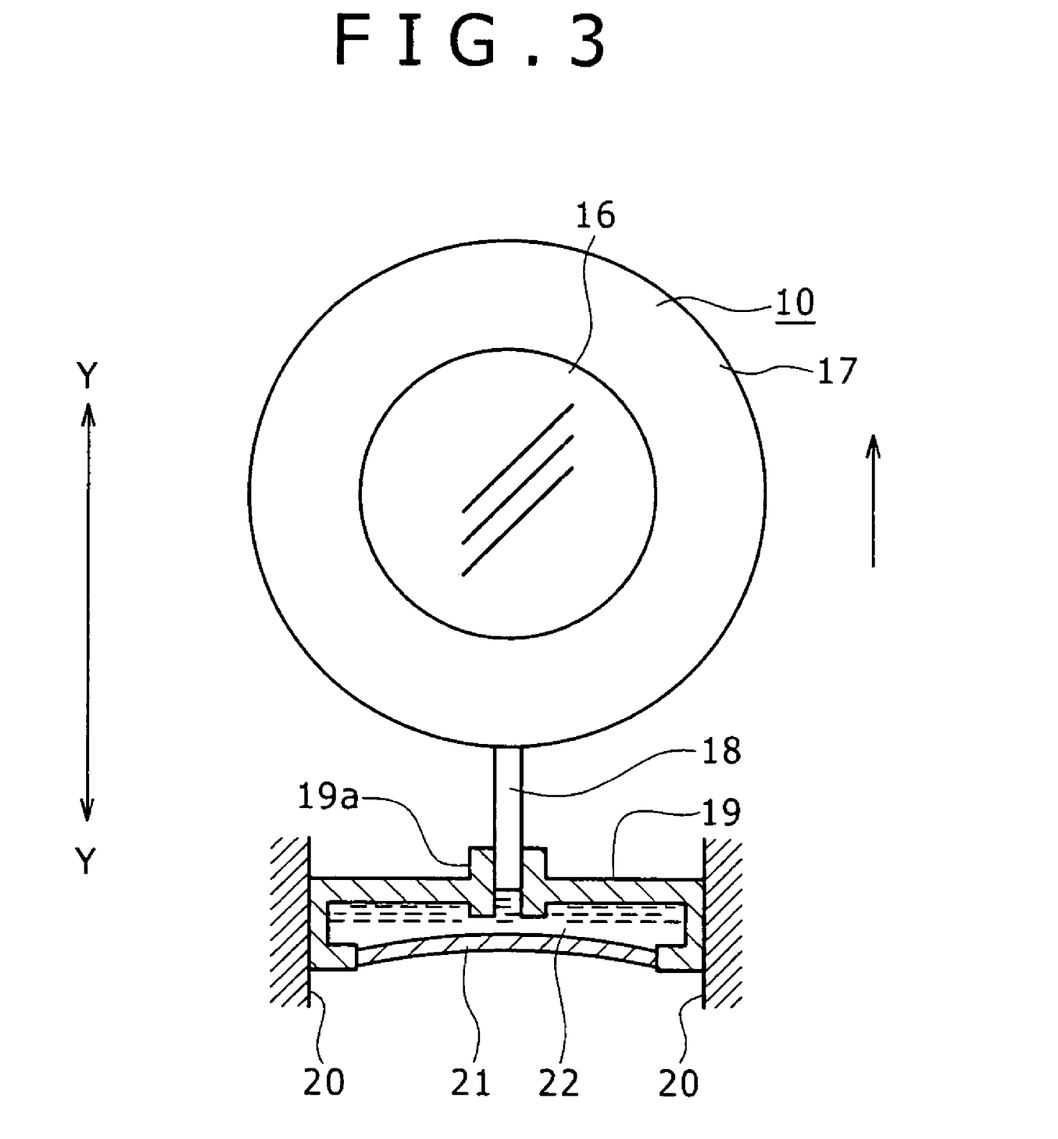
FIG. 3 is a front elevational view, partly in cross section, showing the movable unit which is moved in one direction.

For example, if the central portion of the piezoelectric device 21 is displaced upwardly, the working fluid 22 is displaced in a direction to elevate the fluid level. The power transmitting shaft 18 is pushed upwardly, moving the movable unit 10 upwardly.

Figure 4:
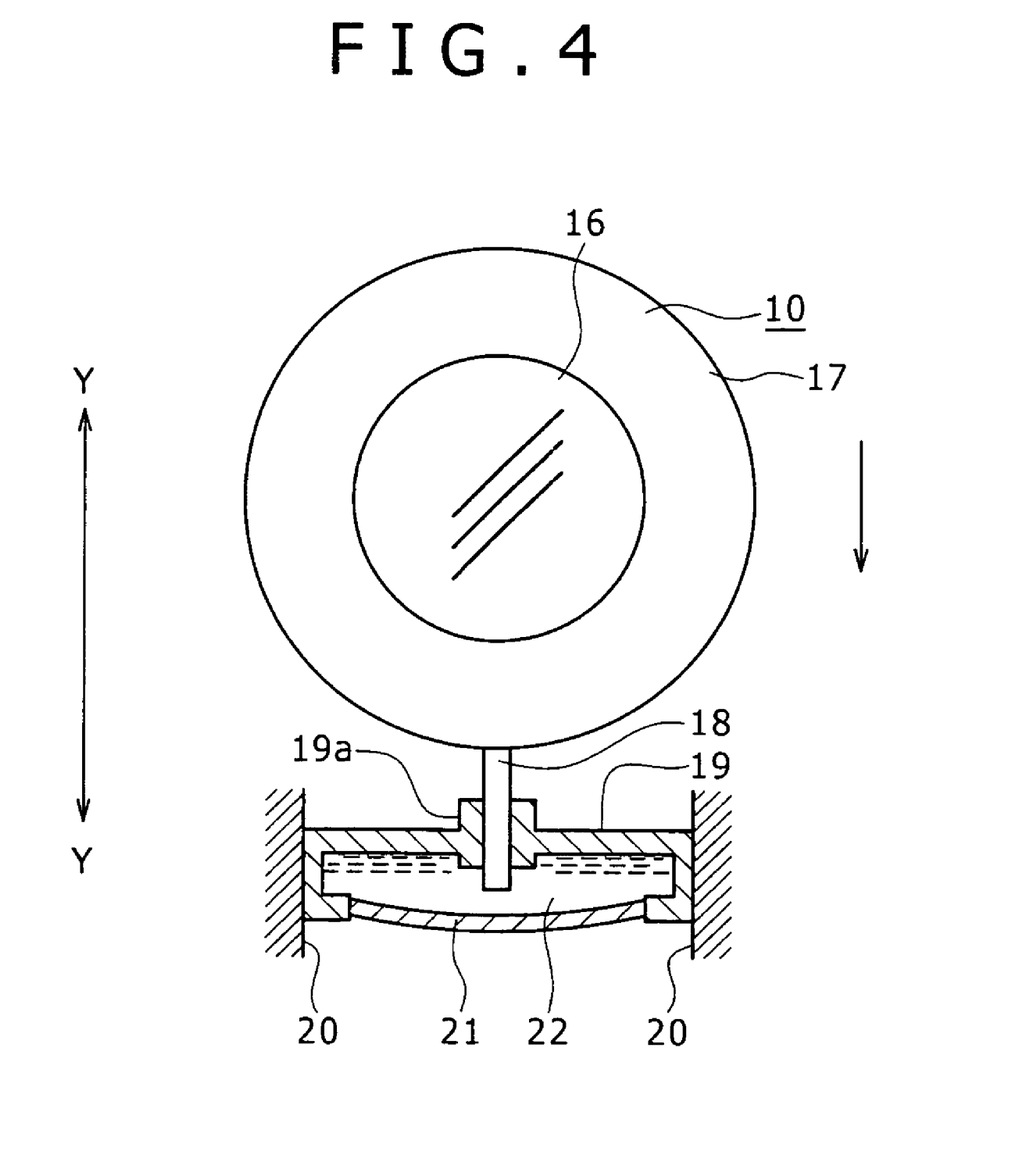
FIG. 4 is a front elevational view, partly in cross section, showing the movable unit which is moved in an opposite direction.

Conversely, if the central portion of the piezoelectric device 21 is displaced downwardly, the working fluid 22 is displaced in a direction to lower the fluid level. The power transmitting shaft 18 is displaced downwardly, moving the movable unit 10 downwardly. At this time, a negative pressure is developed in the fluid case 19 in order to keep a constant pressure therein. The power transmitting shaft 18 is drawn into the fluid case 19 under the negative pressure, and hence it is displaced downwardly.

When the movable unit 10 is displaced in the directions (vertical directions) perpendicular to the optical axis of the movable lens 16, the image pickup apparatus 1 corrects image blurs caused by camera movements and subject movements.

As described above, since the lens actuating device 31 employs the piezoelectric device 21, the lens actuating device 31 is simple in structure and light in weight, and it is small in size as it requires a small installation space.

In particular, the movable unit 10 is constructed of only the movable lens 16, the lens holder 17, and the power transmitting shaft 18, and it does not need an actuating coil and an actuating magnet. Accordingly, the movable unit 10 is light in weight, making it possible to reduce the weight and size of the lens actuating device 31.

In as much as the displacement of the piezoelectric device 21 is transmitted to the movable unit 10 through the working fluid 22, the displacement of the piezoelectric device 21 can be magnified and transmitted to the movable unit 10. Therefore, the lens actuating device 31 allows the movable lens 16 to be moved an increased distance with reduced electric power consumption.

Furthermore, because the drive voltage does not need to be applied to the piezoelectric device 21 to hold the movable lens 16 in a desired position, the lens actuating device 31 is of a small power requirement.

Figure 5:
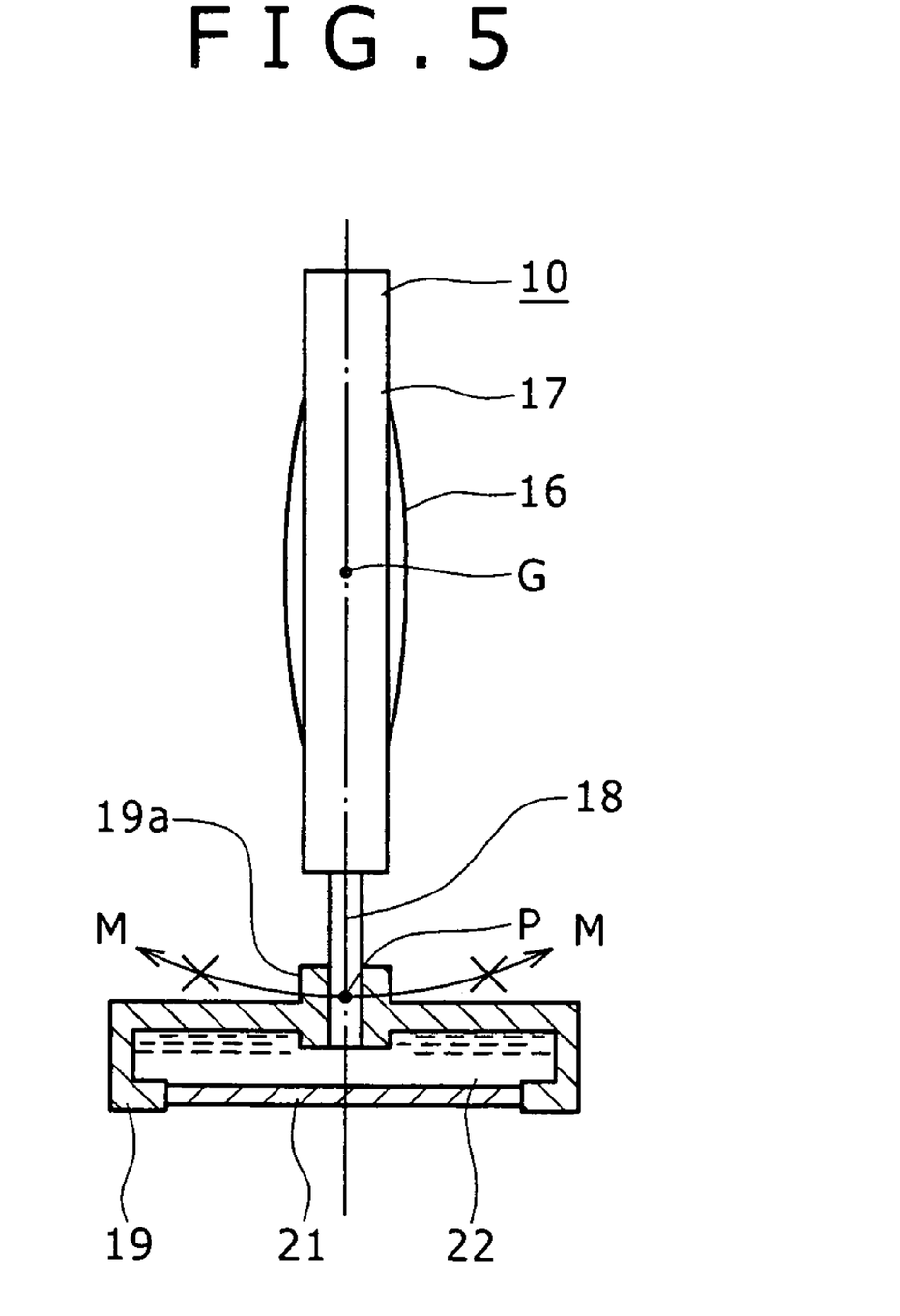
FIG. 5 is a side elevational view, partly in cross section, showing the positional relationship between the center of gravity of the movable unit and a thrust generating point.

The power transmitting shaft 18 is oriented radially of the movable unit 10, i.e., in a direction extending across the center of the movable lens 16 perpendicular to the optical axis thereof. Therefore, as shown in FIG. 5, a line passing through a thrust generating point P, i.e., the power transmitting shaft 18, and the center G of gravity of the movable unit 10, is aligned with the direction in which the movable unit 10 is movable. Consequently, moments M about an axis perpendicular to the optical axis is not produced, allowing the movable unit 10 to operate stably.

"The volume of the working fluid 22 that is displaced in response to the amount of deformation of the piezoelectric device 21" is equal to "the product of the diameter of the power transmitting shaft 18× the distance that the movable unit 10 is moved". Therefore, if the diameter of the power transmitting shaft 18 is reduced, then the amount of deformation of the piezoelectric device 21 that is transmitted to the movable unit 10 is increased, thereby increasing the distance that the movable unit 10 is moved.

Generally, the dynamic equation of a drive system having an actuator is expressed as the following equation 1:

$$M \cdot d^2x/dt^2 + C \cdot dx/dt + K \cdot x = Kt/R \cdot E \qquad 1$$

where M represents the mass of the movable unit, C represents the attenuation coefficient of the movable unit, K represents the spring modulus of the movable unit, Kt represents the thrust constant, R represents the resistance with respect to the voltage, E represents the drive voltage, x represents the distance that the movable unit is moved, and t represents the time.

According to the above dynamic equation 1, it is known that if the attenuation coefficient C of the movable unit is smaller than the critical attenuation coefficient Cc determined by M and K (C<Cc), then the drive system vibrates, and the vibration is greater as the difference between the attenuation coefficient C and the critical attenuation coefficient Cc is greater.

In a drive system where the movable lens is directly supported by the piezoelectric device, the attenuation coefficient C of the movable unit is zero or substantially zero as the attenuation is caused only by air. Therefore, unless a component corresponding to the attenuation coefficient C is generated by a correcting process performed by the control circuit and the like, the operating stability of the drive system where the movable lens is directly supported by the piezoelectric device is low, and the drive system tends to be vibrated by disturbances applied to the movable unit, adversely affecting the function of the drive system to correct image blurs.

In the image pickup apparatus 1, however, since the working fluid 22 is used to transmit the displacement of the piezoelectric device 21 to the movable unit 10, it is possible to increase the attenuation coefficient C for optimizing the function to correct image blurs.

Especially, the closed-loop control system including the CPU 25 for controlling the position of the movable unit 10 based on the amount of displacement of the movable unit 10 as detected by the detecting section 23 has desired control stability for better servo characteristics.

The attenuation coefficient C may have a desired value by selecting an appropriate type of working fluid 22. Accordingly, the lens actuating device 1 may be designed with a greater latitude.

In the above embodiment, the movable unit 10 is moved in the directions indicated by the arrows Y for correcting image blurs. However, if the power transmitting shaft 18 and the fluid case 19 are disposed laterally of the movable unit 10, then the movable unit 10 may be moved in the directions indicated by the arrows X (see FIG. 1).

In the above embodiment, the movable unit 10 is moved in either the directions indicated by the arrows Y or the directions indicated by the arrows X which are perpendicular to the optical axis. According to a first modification (see FIG. 6) described below, the movable unit is movable in a plane including both the directions indicated by the arrows Y and the directions indicated by the arrows X which are perpendicular to the optical axis. The first modification described below differs from the above embodiment shown in FIGS. 2 through 5 only in that moving mechanisms are added and a pair of power transmitting shafts and a pair of fluid cases are provided. Those parts of the first modification which are different from the above embodiment will be described in detail below, and those parts of the first modification which are identical to those of the above embodiment are denoted by identical reference characters and will not be described in detail below.

Figure 6:
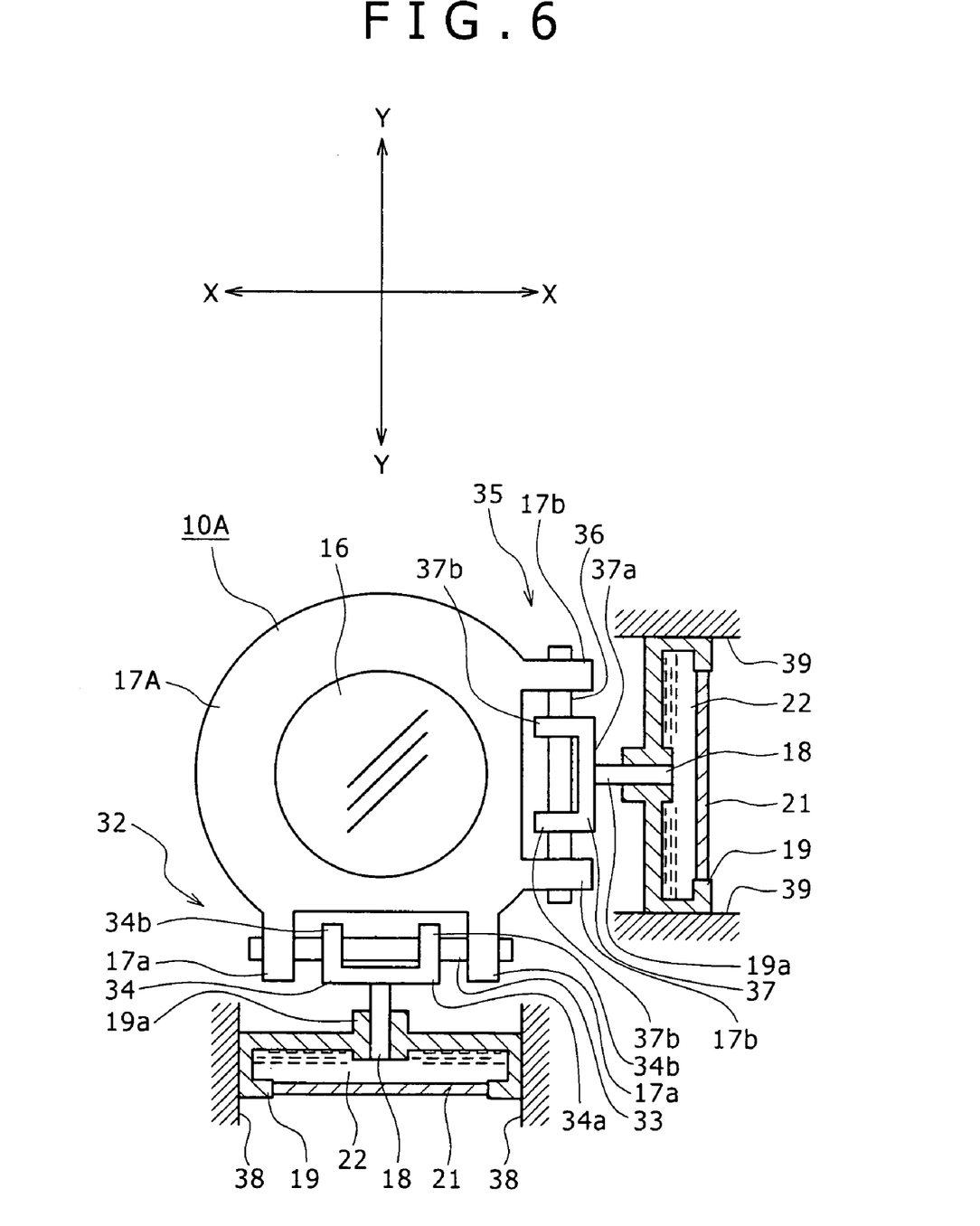
FIG. 6 is a front elevational view, partly in cross section, of a movable unit and a lens actuating device according to a first modification.

According to the first modification, as shown in FIG. 6, a movable unit 10A has a movable lens 16 and a lens holder 17A holding the movable lens 16. The lens holder 17A is supported movably by a pair of fluid cases 19 for movement horizontally in the directions indicated by the arrows X and vertically in the directions indicated by the arrows Y.

The lens holder 17A has a pair of downwardly projecting shaft mount arms 17a and a pair of horizontally projecting shaft mount arms 17b. The shaft mount arms 17a are spaced apart horizontally from each other, and the shaft mount arms 17b are spaced apart vertically from each other.

A first moving mechanism 32 is disposed between the shaft mount arms 17a. The first moving mechanism 32 includes a horizontal guided shaft 33 extending between and mounted on the shaft mount arms 17a, and a guide member 34 by which the horizontal guided shaft 33 is slidably supported. The guide member 34 includes a horizontally extending base 34a and a pair of support arms 34b projecting upwardly from respective opposite side edges of the base 34a. The guided shaft 33 is horizontally slidably supported by the support arms 34b of the guide member 34.

A power transmitting shaft 18 is coupled to the base 34a of the guide member 34 and projects downwardly.

A second moving mechanism 35 is disposed between the shaft mount arms 17b. The second moving mechanism 35 includes a vertical guided shaft 36 extending between and mounted on the shaft mount arms 17b, and a guide member 37 by which the vertical guided shaft 36 is slidably supported. The guide member 37 includes a vertically extending base 37a and a pair of support arms 37b projecting laterally from respective opposite side edges of the base 37a. The guided shaft 36 is vertically slidably supported by the support arms 37b of the guide member 37.

Another power transmitting shaft 18 is coupled to the base 37a of the guide member 37 and projects laterally.

Fluid cases 19 are disposed respectively downwardly and laterally of the movable unit 10A. The fluid cases 19 have opposite side panels fixed to respective fixed walls 38, 39 in the image pickup apparatus 1. The power transmitting shafts 18 are axially slidably supported in respective shaft support sleeves 19a of the fluid cases 19.

When a drive voltage is applied to a piezoelectric device 21 of the lower fluid case 19, the piezoelectric device 21 is deformed such that its central portion is displaced upwardly or downwardly, moving the lower power transmitting shaft 18 and the movable unit 10A vertically in the directions indicated by the arrows Y. At this time, the guided shaft 36 is guided by the guide member 37 to slide vertically.

When a drive voltage is applied to a piezoelectric device 21 of the lateral fluid case 19, the piezoelectric device 21 is deformed such that its central portion is displaced horizontally to the left or right, moving the lower power transmitting shaft 18 and the movable unit 10A vertically in the directions indicated by the arrows X. At this time, the guided shaft 33 is guided by the guide member 34 to slide vertically.

Thus, the movable unit 10A is movable in the plane including both the directions indicated by the arrows X and the directions indicated by the arrows Y which are perpendicular to the optical axis, thereby correcting image blurs caused by camera movements and subject movements.

According to the first modification, as described above, as the movable unit 10A is movable vertically and horizontally, image blurs can be corrected more reliably than with the above embodiment.

A second modification will be described below with reference to FIGS. 7 and 8. The second modification differs from the embodiment shown in FIGS. 2 through 5 only as to the layout and shape of the fluid case. Those parts of the second modification which are different from the above embodiment will be described in detail below, and those parts of the second modification which are identical to those of the above embodiment are denoted by identical reference characters and will not be described in detail below.

Figure 7:
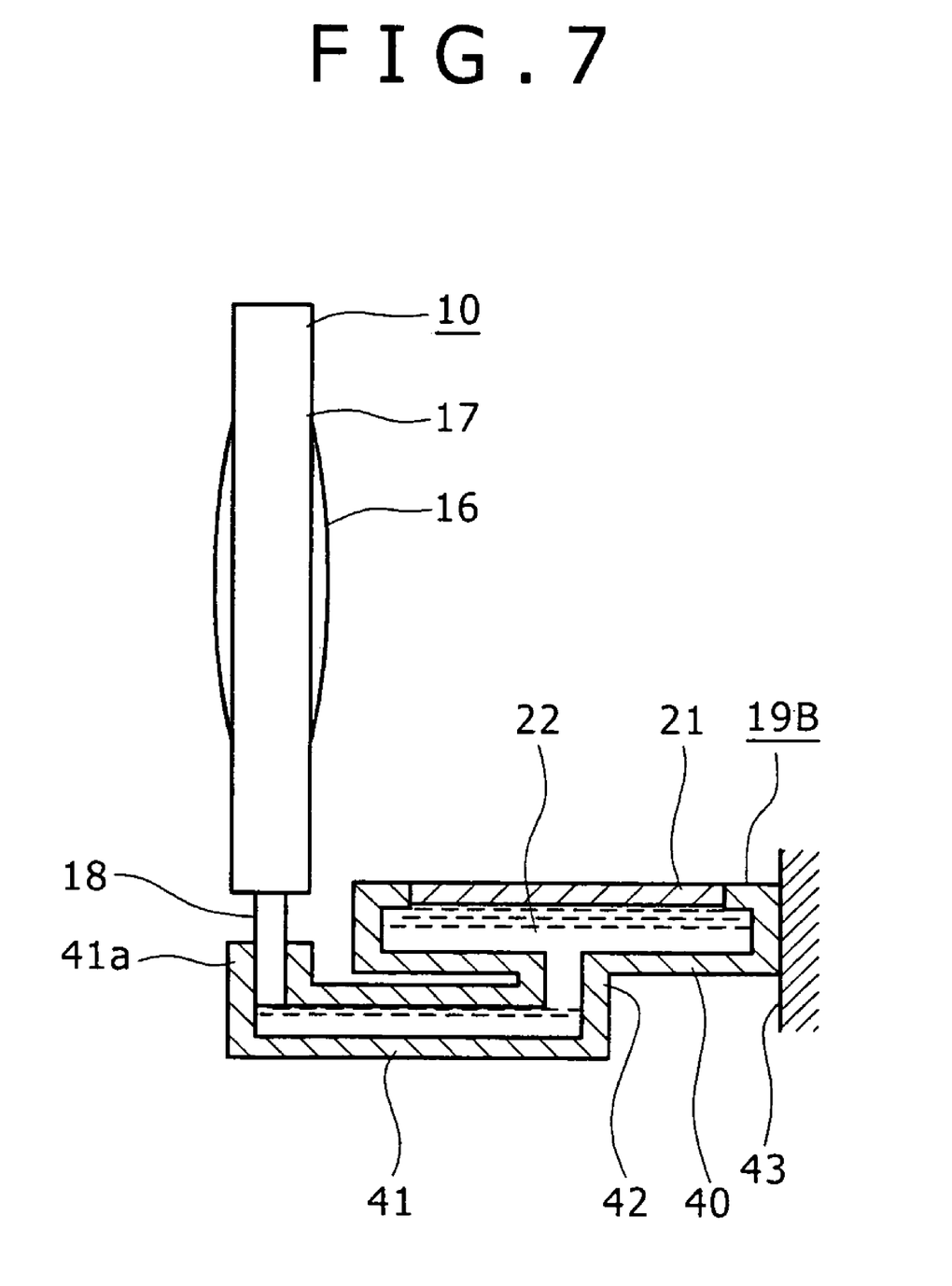
FIG. 7 is a side elevational view, partly in cross section, of a movable unit and a lens actuating device according to a second modification.

As shown in FIG. 7, a fluid case 19B according to the second modification includes a first fluid encasing compartment 40, a second fluid encasing compartment 41, and a joint compartment 42 interconnecting the first fluid encasing compartment 40 and the second fluid encasing compartment 41.

The first fluid encasing compartment 40 has an upper panel partly made of a piezoelectric device 21.

The second fluid encasing compartment 41 is disposed below the first fluid encasing compartment 40 and has a rear end connected to the first fluid encasing compartment 40 by the joint compartment 42. The second fluid encasing compartment 41 has on a front end thereof a vertically extending cylindrical shaft support sleeve 41a which is open upwardly.

Most of the fluid case 19B except for the shaft support sleeve 41a is positioned behind the movable unit 10. The first fluid encasing compartment 40 has a rear panel fixed to a fixed wall 43 in the image pickup apparatus 1. The power transmitting shaft 18 is axially slidably supported in the shaft support sleeve 41a.

When a drive voltage is applied to the piezoelectric device 21 of the fluid case 19B, the piezoelectric device 21 is deformed such that its central portion is displaced upwardly or downwardly, moving the power transmitting shaft 18 and the movable unit 10 vertically.

Thus, the movable unit 10 is movable in the vertical directions which are perpendicular to the optical axis, thereby correcting image blurs caused by camera movements and subject movements.

According to the second modification, since most of the fluid case 19B except for the shaft support sleeve 41a is not positioned radially of the movable unit 10, the fluid case 19B may be disposed in an idle space in the image pickup apparatus 1. Consequently, the space in the image pickup apparatus 1 can be utilized effectively, and the image pickup apparatus 1 can be reduced in size.

The power transmitting shaft 18 is oriented radially of the movable unit 10. Therefore, a line passing through a thrust generating point, i.e., the power transmitting shaft 18, and the center G of gravity of the movable unit 10 is aligned with the direction in which the movable unit 10 is movable. Consequently, no undue moments are produced, allowing the movable unit 10 to operate stably while the image pickup apparatus 1 can be reduced in size.

In the second modification, the movable unit 10 is moved vertically for correcting image blurs. However, in the second modification, the power transmitting shaft 18 and the fluid case 19B may be positioned laterally of the movable unit 10 for moving the movable unit 10 horizontally in the directions indicated by the arrow X.

As with the first modification, a pair of fluid cases 19B may be disposed respectively downwardly and laterally of the movable unit 10 for moving the movable unit 10 in a plane including both the directions indicated by the arrows X and the directions indicated by the arrows Y which are perpendicular to the optical axis.

Figure 8:
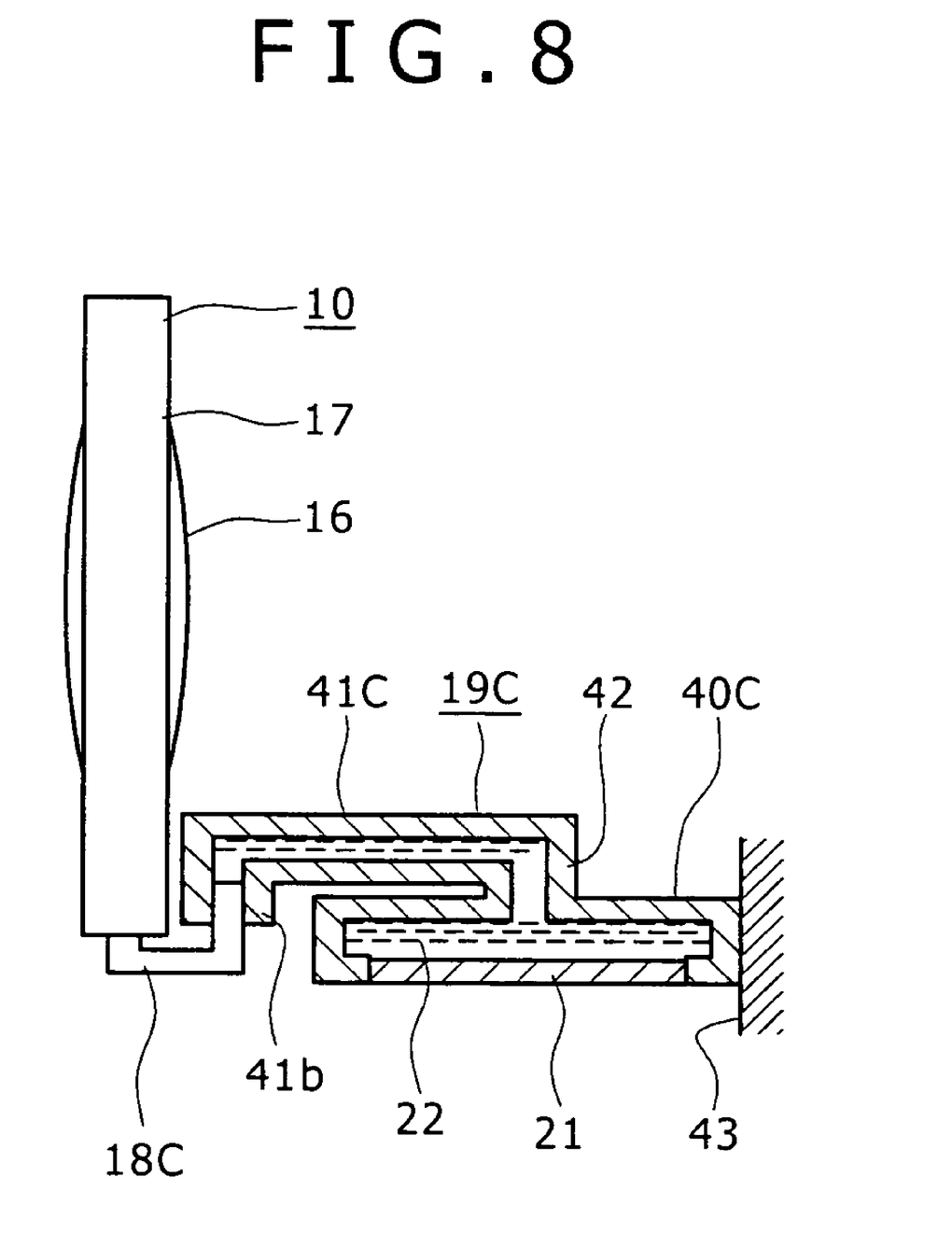
FIG. 8 is a side elevational view, partly in cross section, of a movable unit and a lens actuating device according to a modification of the second modification.

FIG. 8 shows a modification of the second modification. As shown in FIG. 8, a substantially C-shaped power transmitting shaft 18C is employed to provide a fluid case 19C that is positioned behind the movable unit 10. The fluid case 19C has a first fluid encasing compartment 40C and a second fluid encasing compartment 41C positioned above the first fluid encasing compartment 40C. The first fluid encasing compartment 40C has a lower panel partly made of a piezoelectric device 21. The second fluid encasing compartment 41C has a vertically extending cylindrical shaft support sleeve 41b that is open downwardly.

Since the fluid case 19C is disposed in its entirety behind the movable unit 10, but not radially of the movable unit 10, any space required radially of the movable unit 10 is small. Therefore, the space in the image pickup apparatus 1 can be utilized effectively, and the image pickup apparatus 1 can be reduced in size.

In the second modification, most of the fluid case 19B except for the shaft support sleeve 41a is positioned behind the movable unit 10, or the fluid case 19C is disposed in its entirety behind the movable unit 10. However, most of the fluid case 19B except for the shaft support sleeve 41a or the entire fluid case 19C may be disposed forwardly of the movable unit 10.

Figure 9:
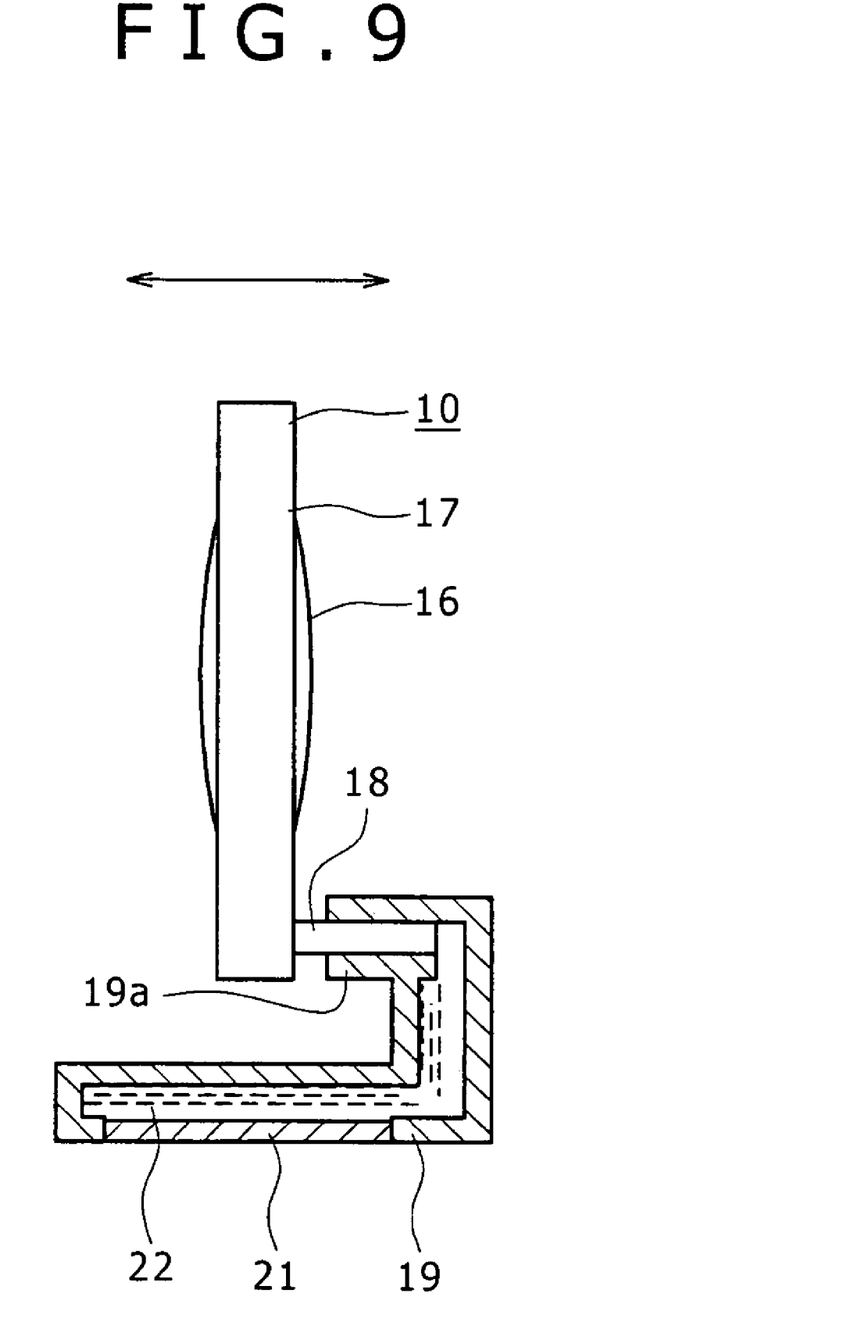
FIG. 9 is a side elevational view, partly in cross section, of a movable unit and a lens actuating device for moving the movable unit along an optical axis thereof.

In the above embodiment and modifications, the movable units 10, 10A are moved in directions perpendicular to the optical axis for correcting image blurs. However, the principles of the present invention are applicable to a lens actuating device for moving the movable unit along the optical axis. For example, as shown in FIG. 9, a power transmitting shaft 18 may have its axis extending forwardly or rearwardly along the optical axis so that the power transmitting shaft 18 is movable along the optical axis.

The various terms representative of the directions referred to above, e.g., above, below, horizontal, vertical, forward, rearward, etc., are given for illustrative purposes only, and they should not be interpreted as being restrictive in the present invention.

The specific shapes and structures of the parts described and shown above are by way of example only, and they should not limit the technical scope of the present invention.

Although certain preferred embodiments of the present invention have been shown and described in detail, it should be understood that various changes and modifications may be made therein without departing from the scope of the appended claims.

What is claimed is:

1. A lens actuating device for moving a movable lens held by a lens holder in predetermined directions, comprising:
   a power transmitting shaft adapted to be connected to the lens holder for movement in axial directions thereof; and
   a fluid case having a shaft support sleeve and filled with a working fluid, said power transmitting shaft being axially slidably supported in said shaft support sleeve;
   said fluid case including a piezoelectric device as a portion thereof;
   wherein when a drive voltage is applied to said piezoelectric device, said piezoelectric device can be deformed to displace said working fluid in said fluid case to move said power transmitting shaft axially, thereby moving said lens holder and said movable lens in said predetermined directions.

2. The lens actuating device according to claim 1, further comprising:
   a pair of moving mechanisms for moving said lens holder in directions perpendicular to the optical axis of said movable lens;
   a pair of said fluid cases; and
   a pair of said power transmitting shafts supported respectively in the shaft support sleeves of said fluid cases for movement in the directions perpendicular to the optical axis of said movable lens;
   said power transmitting shafts being connected to said lens holder respectively through said moving mechanisms.

3. The lens actuating device according to claim 1, wherein said fluid case has a portion except for said shaft support sleeve, said portion not being positioned radially of said movable lens.

4. An image pickup apparatus including:
   a movable lens held by a lens holder; and
   a lens actuating device for moving said movable lens in predetermined directions;
   said lens actuating device comprising:
   a power transmitting shaft connected to the lens holder for movement in axial directions thereof; and
   a fluid case having a shaft support sleeve and filled with a working fluid, said power transmitting shaft being axially slidably supported in said shaft support sleeve;
   said fluid case including a piezoelectric device as a portion thereof;
   wherein when a drive voltage is applied to said piezoelectric device, said piezoelectric device can be deformed to displace said working fluid in said fluid case to move said power transmitting shaft axially, thereby moving said lens holder and said movable lens in said predetermined directions.

5. A lens actuating device for moving a movable lens held by a lens holder in predetermined directions, comprising:
   a piezoelectric device, said piezoelectric device being elastically deformable upon receipt of a drive voltage;
   a fluid case, said fluid case and said piezoelectric device encasing a working fluid; and
   a power transmitting shaft connected to said lens holder, said power transmitting shaft extending through said fluid case to said working fluid,
   wherein, upon receipt of said drive voltage, said piezoelectric device displaces said working fluid, displacement of said working fluid moving said power transmitting shaft.

6. The lens actuating device according to claim 5, wherein a shaft support sleeve is on said fluid case, said power transmitting shaft extending through said shaft support sleeve to said working fluid.

7. The lens actuating device according to claim 5, wherein a distal end of said power transmitting shaft extends to said working fluid and another distal end of said power transmitting shaft is connected to said lens holder.

8. An image pickup apparatus comprising:
   a lens actuating device according to claim 5; and
   a movable lens held by a lens holder.

* * * * *